Patented Oct. 20, 1925.

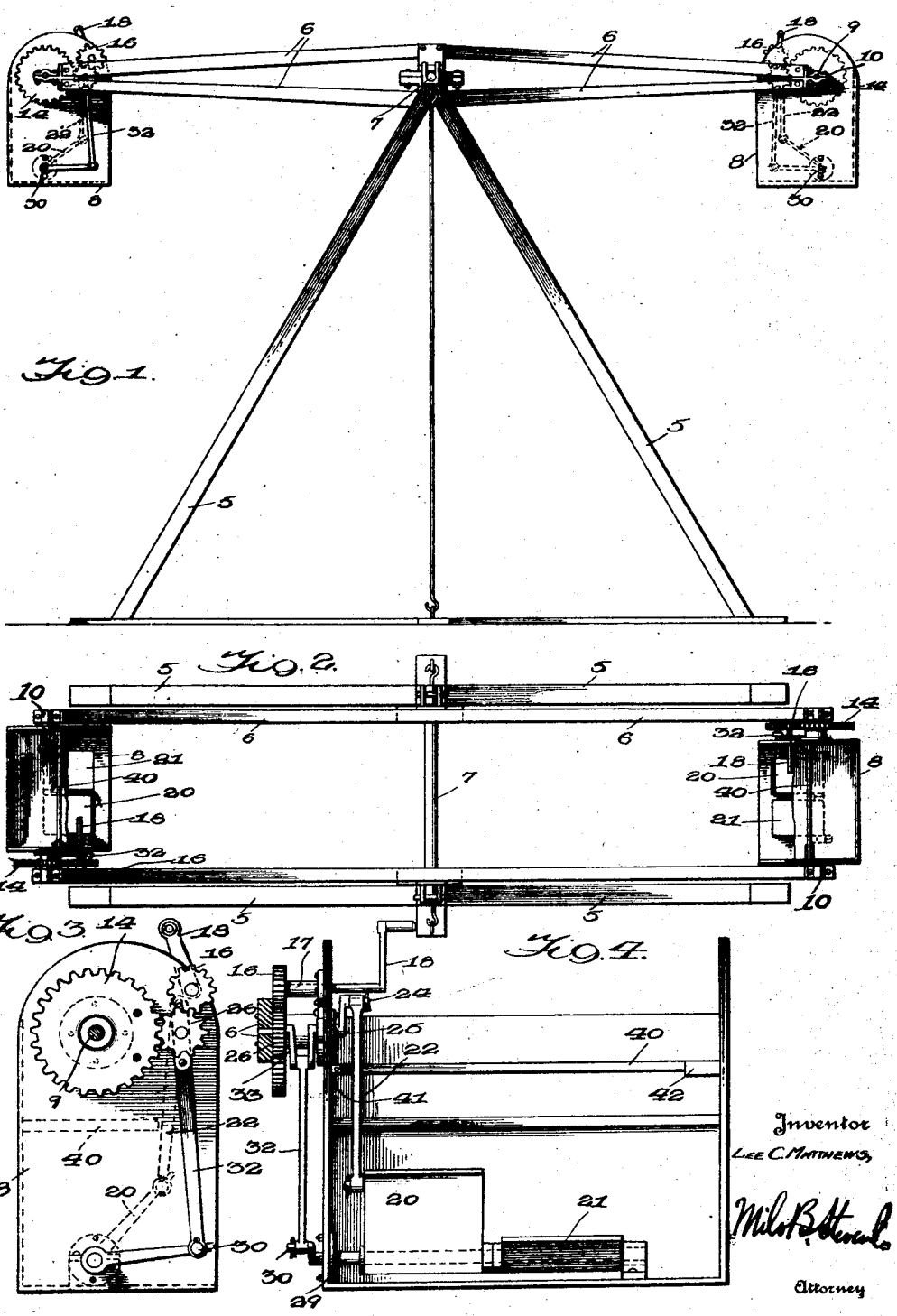

1,557,942

UNITED STATES PATENT OFFICE.

LEE CORYDON MATTHEWS, OF SAN QUENTIN, CALIFORNIA.

AMUSEMENT DEVICE.

Application filed September 11, 1922. Serial No. 587,365.

*To all whom it may concern:*

Be it known that I, LEE C. MATTHEWS, a citizen of the United States, residing at San Quentin, in the county of Marin and State of California, have invented new and useful Improvements in Amusement Devices, of which the following is a specification.

This invention relates to amusement devices and has for a major object the provision of simple means whereby the occupants of the device may rock the same in a seesaw manner by changing the centers of gravity of the several carriages.

A further object is to provide an amusement device of the character specified which is of highly simplified construction, safe to use, and cheap to manufacture.

Other objects and advantages will be apparent during the course of the following description.

In the accompanying drawing forming a part of this application and in which like numerals are employed to designate like parts throughout the same, Figure 1 is a side elevation of the improved amusement device;

Fig. 2 is a plan view of the device;

Fig. 3 is a side elevation of one of the carriages embodied in the invention;

Fig. 4 is a front elevation of one of the carriages embodied in the invention.

In the drawing, the numeral 5 designates an approximately triangular frame connected to the intermediate portions of beams 6 through the medium of a main shaft 7.

With reference to Fig. 1 it will be seen that the beams 6 are adapted for a rocking movement about the axis of the shaft 7 and that the outer portions of the beams have connection with carriages 8 through the medium of stub shafts 9. The stub shafts 9 project outwardly from the ends of the carriages and are extended through bearings 10 carried by the ends of the beams. It is thus seen that the connection between the carriages and the ends of the beams permits the carriages to be swung about the axes or rocked about the axes of the stub shafts so as to change the centers of gravity of the carriages thereby bringing about the rocking of the beams 6.

Particular attention is directed to Figs. 2 and 3 which plainly illustrate that a gear 14 is rigidly secured to one end portion of each beam 6 and receives the adjacent stub shaft. Each gear 14 has connection with a smaller gear 16 through the medium of a second small gear 26 and each gear 16 has a shaft extended through a bearing sleeve 17.

Each crank 18 is located within convenient reach of the operator so that he may operate the same to bring about a change in the center of gravity of the seat or carriage which is occupied.

Of course, the occupants of the several carriages may operate the driving mechanism of the several carriages synchronously or alternating to bring about an even rocking movement. The extent to which the carriages are moved about the axes of the stub shafts regulates or controls the rocking movement of the beams.

The operation of the hand cranks 18 may be supplemented by treadles 20 and 21, the treadle 20 having connection with connecting rods 22 and the upper portions of the connecting rods 22 are connected to cranks 24 of crank shafts 25. Each carriage is provided with one crank shaft 25, the outer portion of which has a gear 26 which engages the main gear 14 so that when the treadle 20 is operated the gear 26 will ride about the main gear 14 and thereby bring about a change in the position of the weight of the associated carriage.

Each treadle 21 is keyed or otherwise rigidly secured to a shaft 29, the outer portion of which is provided with a crank 30. A connecting rod 32 is connected to each crank 30 and has its upper portion connected to a crank 33 forming a part of the shaft 25.

With reference to the foregoing it will be seen that the treadles 20 and 21 work opposite each other and are adapted for engagement by the feet of the occupants of the several carriages so that if desired the driving of the mechanism of the several carriages may be controlled entirely by the feet of the occupants or the driving of the shifting mechanism of the several carriages may be brought about by the combined use of the treadles and the hand cranks.

In case one occupant is heavier than the other the carriage of the lighter occupant may be weighted in any suitable manner.

Fig. 4 illustrates that a safety bar 40 is pivoted to each carriage 41 and is adapted to engage a socket member 42, by means of which the bar may be held in an approximately horizontal position in front of the occupants so as to hold the occupants in the carriages.

It is possible by substantial changes in the position of weight in the two carriages to bring about the complete turning of the beams 6 about the main shaft 7 and the carriage will not at no time tilt to such an extent as to endanger the occupants.

Having thus described the invention, what is claimed is:

1. An amusement device comprising a frame, a shaft having connection with the frame, beams connected intermediate their ends to the shaft, carriages having stub shafts connected to the terminal portions of said beams, main gears fastened rigidly to said beams, shafts carried by said carriages and having gears connected to said first-named gears, said last-named shafts being provided with hand cranks by means of which the second-named gears may be manually turned for changing the center of gravity of the carriages.

2. An amusement device comprising a frame, a shaft having connection with the frame, beams connected intermediate their ends to the shaft, carriages having stub shafts connected to the terminal portions of said beams, main gears fastened rigidly to said beams, shafts carried by said carriages, having gears connected to said first-named gears, said last-named shafts being provided with hand cranks by means of which the second-named gears may be manually turned for changing the center of gravity of the carriages, crank shafts carried by said carriages and having gears connected to said main gears, connecting rods connected to said crank shafts, and foot operated treadles having connection with said connecting rods.

3. The combination with a pair of beams, of a frame supporting the beams for movement about a horizontal axis, carriages connected to the outer portions of the beams, main gears having rigid connection with said beams, actuating gears engaged with said main gears and having shafts extending through the ends of the carriages, and occupant controlled means connected to said shafts for operating said first and second named gears for changing the center of gravity of the carriages.

LEE CORYDON MATTHEWS.